(12) United States Patent
McMillan et al.

(10) Patent No.: US 7,384,240 B2
(45) Date of Patent: Jun. 10, 2008

(54) COMPOSITE BLADE

(75) Inventors: Alison J McMillan, Uttoxeter (GB); Andrew D Jackson, Derby (GB)

(73) Assignee: Rolls-Royce plc, London (GB)

( * ) Notice: Subject to any disclaimer, the term of this patent is extended or adjusted under 35 U.S.C. 154(b) by 238 days.

(21) Appl. No.: 11/288,382

(22) Filed: Nov. 29, 2005

(65) Prior Publication Data
US 2006/0140772 A1 Jun. 29, 2006

(30) Foreign Application Priority Data
Dec. 24, 2004 (GB) ................. 0428368.5

(51) Int. Cl.
*F01D 5/14* (2006.01)
(52) U.S. Cl. ..................... 416/131; 416/230
(58) Field of Classification Search ............ 415/12; 416/223 A, 131, 13
See application file for complete search history.

(56) References Cited

U.S. PATENT DOCUMENTS

| 870,171 | A | 11/1907 | Hill |
| 3,637,325 | A | 1/1972 | Morley |
| 3,649,425 | A | 3/1972 | Alexander |
| 3,749,518 | A | 7/1973 | Alver |
| 3,784,322 | A | 1/1974 | Erich |
| 3,883,267 | A | 5/1975 | Baudier |
| 4,022,547 | A | 5/1977 | Stanley |
| 4,627,791 | A | 12/1986 | Marshall |
| 4,738,902 | A | * 4/1988 | Prewo et al. ............... 428/697 |
| 5,127,802 | A | 7/1992 | Carlson |

FOREIGN PATENT DOCUMENTS

| DE | 4 122 652 A | 1/1992 |
| DE | 10246311 AB | 4/2004 |
| EP | 0 764 763 A | 3/1997 |
| GB | 1 328 167 SP | 8/1973 |
| GB | 1328167 | * 8/1973 |
| SU | 0 486 221 AB | 9/1975 |

* cited by examiner

*Primary Examiner*—Richard Edgar
(74) *Attorney, Agent, or Firm*—W. Warren Taltavull; Manelli Denison & Selter PLLC

(57) ABSTRACT

A composite blade (26) comprises a root portion (36) and an aerofoil portion (38). The aerofoil portion (38) has a tip (42), a chord (C), a leading edge (44), a trailing edge (46), a suction surface (48) extending from the leading edge (44) to the trailing edge (46) and a pressure surface extending from the leading edge (44) to the trailing edge (46). The composite blade (26) comprises reinforcing fibres (52) in a matrix material (54). The aerofoil portion (38) adjacent the root portion (36) has regions (56, 58) at least at the leading edge (44) and trailing edge (46) comprising an asymmetric lay up of reinforcing fibres (52) and the aerofoil portion (38) adjacent the tip (42) having at least a region (62) at the mid-chord comprising an asymmetric lay up of reinforcing fibres (52).

29 Claims, 6 Drawing Sheets

COMPOSITE BLADE

FIELD OF THE INVENTION

The present invention relates to a composite blade and in particular to a composite compressor blade, a composite fan blade, a composite propeller blade or a composite turbine blade for a gas turbine engine.

BACKGROUND OF THE INVENTION

It is known that different aerofoil shapes for fan blades, or compressor blades, perform differently at different operating conditions. A fan blade, may be optimised for take off conditions, or for cruise conditions, but to perform adequately for both take off conditions and cruise conditions generally requires a compromised aerofoil shape. The compromise to the aerofoil shape is based upon the mission that a particular gas turbine engine is to perform, for example whether the gas turbine engine is for long distance flight, short distance flight etc.

A fan blade, or a compressor blade, generally comprises a twisted aerofoil, e.g. the stagger angle increases from the root to the tip of the aerofoil portion of the fan blade or compressor blade, to give the correct angle of incidence at each point along the length, radius, of the aerofoil portion of the fan blade, or compressor blade. In operation due to rotation of the rotor upon which the fan blades, or compressor blades, are mounted the aerofoil portions of the fan blades, or compressor blades, untwist due to the centripetal loads and these centripetal loads increase with increasing rotational speed. Typically the aerofoil portion of a fan blade untwists by about 5°, where 4° of the fan blade untwist is due to the centripetal loads and 1° of the fan blade untwist is due to gas pressure loads. Generally the increase of untwist with increasing rotational speed is an advantage because it results in an increase in efficiency, but the untwist of the aerofoil portions of current fan blades does not provide as much untwist as is required.

A fan blade, or compressor blade, generally comprises an aerofoil portion, which is strongly curved, or cambered, into a C-shaped cross-section near the root portion of the fan blade, or compressor blade, because the gas flow velocity is relatively low and the curvature of the aerofoil portion enables the gas flow impinging on the radially inner region of the aerofoil portion to work harder on the inner region of the aerofoil portion. The aerofoil portion 138 is nearly straight in cross-section in the tip region of the aerofoil portion 138, with a suction surface 148, a pressure surface 150 and a bend at the trailing edge 146, as shown in FIG. 11. The straightness and amount of bend at the trailing edge 146 of the aerofoil portion 138 is a matter of compromise between part speed, e.g. cruise, and high-speed, e.g. take off, operational requirements.

A fan blade, or compressor blade, optimised for high-speed, e.g. take off, operation is S-shaped in cross-section at the tip region of the aerofoil portion 238 as shown in FIG. 12. An S-shaped cross-section is generally one where the suction surface 248 is initially concave 247 and then convex 249 between the leading edge 244 and the trailing edge 246 and the pressure surface 250 is initially convex 251 and then concave 253 between the leading edge 244 and the trailing edge 246.

A compressor blade, optimised for part speed, e.g. cruise, operation is C-shaped in cross-section at the tip region of the aerofoil portion 338 as shown in FIG. 13. A C-shaped cross-section is generally one where the suction surface 348 is convex between the leading edge 344 and the trailing edge 346 and the pressure surface 350 is concave between the leading edge 344 and the trailing edge 346.

High speed operation, for example take off, is 100% rotational speed and part speed, for example cruise, is 95% rotational speed, although it is desirable to reduce the air speed of an aircraft during cruise conditions to increase the efficiency of the aircraft and this results in a corresponding reduction in rotational speed of the rotor and fan blades and therefore cruise speed may be less than 95% rotational speed.

Fan blades, which can be optimised for a wide variation in operating rotational speeds have a significant advantage to enable a significant reduction in specific fuel consumption.

SUMMARY OF THE INVENTION

Accordingly the present invention seeks to provide a novel composite blade.

Accordingly the present invention provides a composite blade comprising a root portion and an aerofoil portion, the aerofoil portion having a tip, a chord, a leading edge, a trailing edge, a suction surface extending from the leading edge to the trailing edge and a pressure surface extending from the leading edge to the trailing edge, the composite blade comprising reinforcing fibres in a matrix material, the aerofoil portion adjacent the tip having at least a region at the mid chord comprising an asymmetric arrangement of reinforcing fibres.

Preferably the aerofoil portion adjacent the root portion having regions at least at the leading edge and trailing edge comprising an asymmetric arrangement of reinforcing fibres.

Preferably the composite blade is a compressor, blade, a fan blade, a propeller blade or a turbine blade.

Preferably the composite blade comprises an organic matrix material.

Preferably the organic matrix material comprises an epoxy resin.

Preferably the reinforcing fibres comprise carbon fibres or glass fibres.

Alternatively the composite blade comprises a metal matrix material or a ceramic matrix material.

Alternatively the composite blade comprises ceramic fibres.

Alternatively the ceramic fibres comprise silicon carbide fibres or silicon nitride fibres.

The present invention also provides a rotor assembly comprising a rotor carrying a plurality of circumferentially arranged radially outwardly extending composite blades, each composite blade comprising a root portion and an aerofoil portion, the aerofoil portion having a tip, a chord, a leading edge, a trailing edge, a suction surface extending from the leading edge to the trailing edge and a pressure surface extending from the leading edge to the trailing edge, each composite blade comprising reinforcing fibres in a matrix material, the aerofoil portion adjacent the tip having at least a region at the mid chord comprising an asymmetric arrangement of reinforcing fibres such that in operation the tip of the composite blade is movable between a first position having a C-shaped cross-section at a first rotational speed and a second position having an S-shaped cross-section at a second, higher, rotational speed.

Preferably, the aerofoil portion adjacent the root portion having regions at least at the leading edge and trailing edge comprising an asymmetric arrangement of reinforcing fibres such that in operation the composite blade is movable between a first position having a first twist angle at the first rotational speed and a second position having a second, smaller, twist angle at the second, higher, rotational speed.

Preferably the composite blades are compressor blades, fan blades, propeller blades or turbine blades.

Preferably the composite blades comprise an organic matrix material.

Preferably the organic matrix material comprises an epoxy resin.

Preferably the reinforcing fibres comprise carbon fibres or glass fibres.

Alternatively the composite blade comprises a metal matrix material or a ceramic matrix material.

Alternatively the composite blade comprises ceramic fibres.

Alternatively the ceramic fibres comprise silicon carbide fibres or silicon nitride fibres.

DESCRIPTION OF THE DRAWINGS

The present invention will be more fully described by way of example with reference to the accompanying drawings in which.

DETAILED DESCRIPTION OF THE INVENTION

Figure 1:
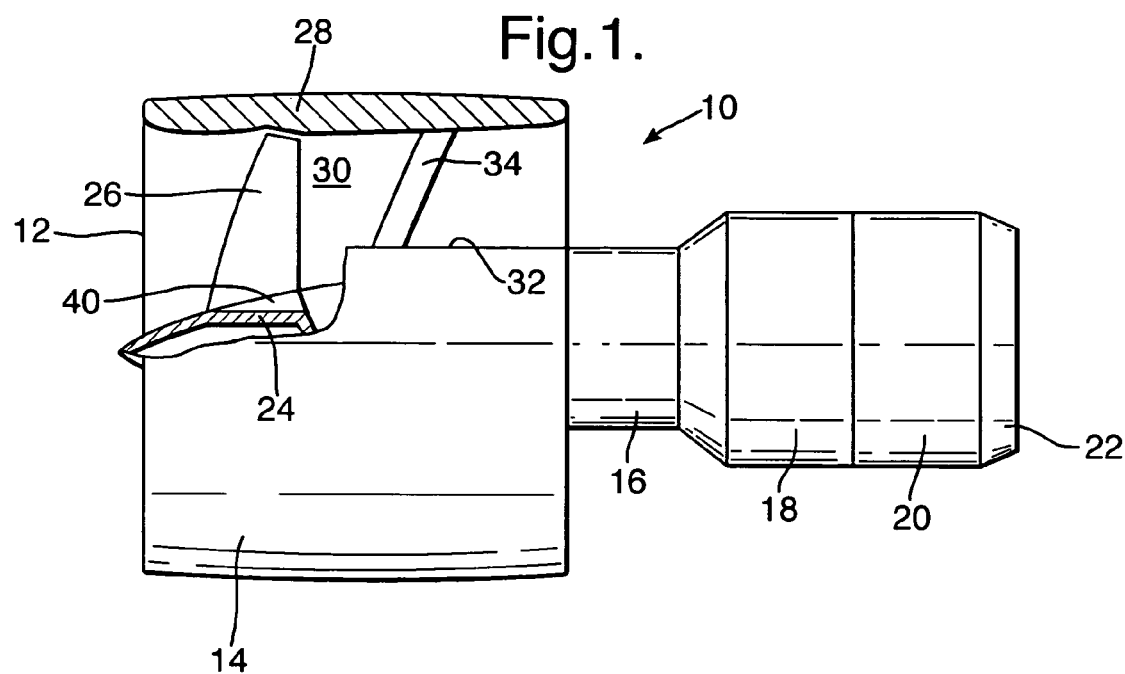
FIG. 1 shows a turbofan gas turbine engine having a composite blade according to the present invention.

A turbofan gas turbine engine 10, as shown in FIG. 1, comprises in flow series an intake 12, a fan section 14, a compressor section 16, a combustion section 18, a turbine section 20 and an exhaust 22. The fan section 14 comprises a fan rotor 24 and a plurality of circumferentially spaced radially outwardly extending fan blades 26 secured to the fan rotor 24. The fan section 14 also comprises a fan casing 28, which surrounds the fan rotor 24 and fan blades 26 and the fan casing 28 partially defines a fan duct 30. The fan casing 28 is secured to a core casing 32 by a plurality of circumferentially spaced radially extending fan outlet guide vanes 34.

The turbofan gas turbine engine 10 is quite conventional and its operation and construction will not be discussed further.

A fan blade 26 is shown more clearly in FIGS. 2, 3, 4 and 5. The fan blade 26 comprises a root portion 36 and an aerofoil portion 38. The root portion 36 is preferably dovetail shape in cross-section, but may be firtree shape in cross-section. The root portion 36 is arranged to locate in a correspondingly shaped groove 40 in the rim of the fan rotor 24. The aerofoil portion 38 comprises a tip 42 remote from the root portion 36, a chord C, a leading edge 44, a trailing edge 46, a suction surface 48 extending from the leading edge 44 to the trailing edge 46 and a pressure surface 50 extending from the leading edge 44 to the trailing edge 46.

Figure 2:
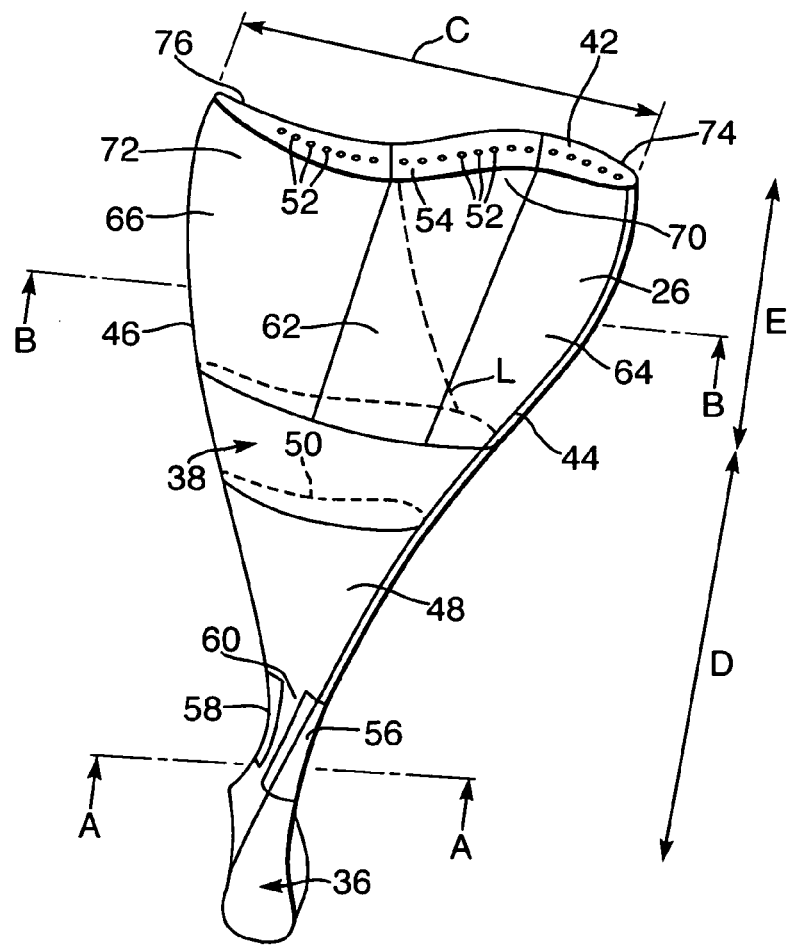
FIG. 2 shows is an enlarged perspective view of a composite blade according to the present invention.

The fan blade 26 operates at subsonic conditions over radially extending region D and the fan blade operates at supersonic conditions over radially extending region E, as shown in FIG. 2. The extent of radially extending region D is greater when the rotational speed of the fan rotor 24 and fan blades 26 is lower, e.g. cruise, and the extent of radially extending region E is correspondingly less. The extent of radially extending region E is greater when the rotational speed of the fan rotor 24 and fan blades 26 is higher, e.g. take off, and the extent of radially extending region D is correspondingly less.

The fan blade 26 is a composite fan blade and comprises reinforcing fibres 52 in a matrix material 54. The reinforcing fibres 52 for example comprise carbon fibres, glass fibres or other suitable fibres. The matrix material 54 comprises an organic matrix material for example epoxy resin sold under the trade name RTM6.

The aerofoil portion 38 of the fan blade 26 comprises an arrangement of the lay up of the reinforcing fibres 52 within the matrix material 54 such that in operation of the turbofan gas turbine engine 10 the aerofoil portion 38 of the fan blade 26 untwists, reduces in stagger angle, with increasing rotational speed and the tip 42 of the aerofoil portion 38 changes from a C-shaped cross-section to an S-shaped cross-section with increasing rotational speed. This untwisting of the aerofoil portion 38 of the fan blade 26 with increasing rotational speed increases the efficiency of the fan blade 26 and the changing of the cross-sectional shape of the tip 42 of the aerofoil portion 42 of the fan blade 26 with increasing rotational speed also increases the efficiency of the fan blade 26. Thus the tip 42 of the aerofoil portion 38 of the fan blade 26 is C-shaped in cross-section at part speed, e.g. cruise, conditions, e.g. cruise conditions, and is S-shaped in cross-section at high speed, e.g. take off conditions. FIG. 2 actually shows the shape of the fan blade 26 at high-speed conditions.

Figure 3:
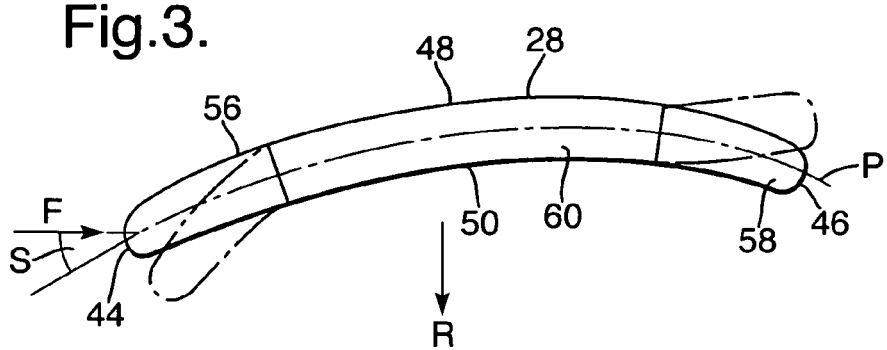
FIG. 3 is an enlarged cross-sectional view along line A-A through the composite blade shown in FIG. 2.

In one example, the aerofoil portion 38 of the fan blade 26 is arranged such that the aerofoil portion 38 adjacent the root portion 36 has regions 56 and 58 at the leading edge 44 and trailing edge 46 respectively, which comprise an asymmetric lay up of reinforcing fibres 52, as shown more clearly in FIG. 3. The lay up of the reinforcing fibres 52 within a mid-chord region 60 between the regions 56 and 58 comprises a symmetric lay up of reinforcing fibres 52. The aerofoil portion 38 of the fan blade 26 is arranged such that the aerofoil portion 38 adjacent the tip 42 of the fan blade 26 is arranged such that a region 62 at the mid-chord comprises an asymmetric lay up of reinforcing fibres 52, as shown more clearly in FIG. 4. The lay up of the reinforcing fibres 52 within the regions 64 and 66 at the leading edge 44 and trailing edge 46 respectively comprises a symmetric lay up of reinforcing fibres 52. The regions 62, 64 and 66 extend longitudinally of the fan blade 26 from the tip 42 over the region E where fan blade 26 operates at supersonic rotational speeds. The position of the interface between regions D and E depends upon the maximum operational rotational speed of the fan rotor 24. Thus the regions 62, 64 and 66 extend from the tip 42 to a longitudinal, or radial, position on the fan blade 26 where there is an instantaneous Mach 1 speed at 100% rotational speed, e.g. take off, of the fan rotor 24 and fan blades 26. The asymmetric lay up of reinforcing fibres 52 within the region 62 is such that the S-shaped cross-section is most pronounced at the tip 42 and reduces to nothing towards the interface between regions D and E. The point of inflexion also moves towards the leading edge 44 as indicated by dashed line L and may reach the leading edge 44 or reduce to nothing at the leading edge 44.

Figure 4:
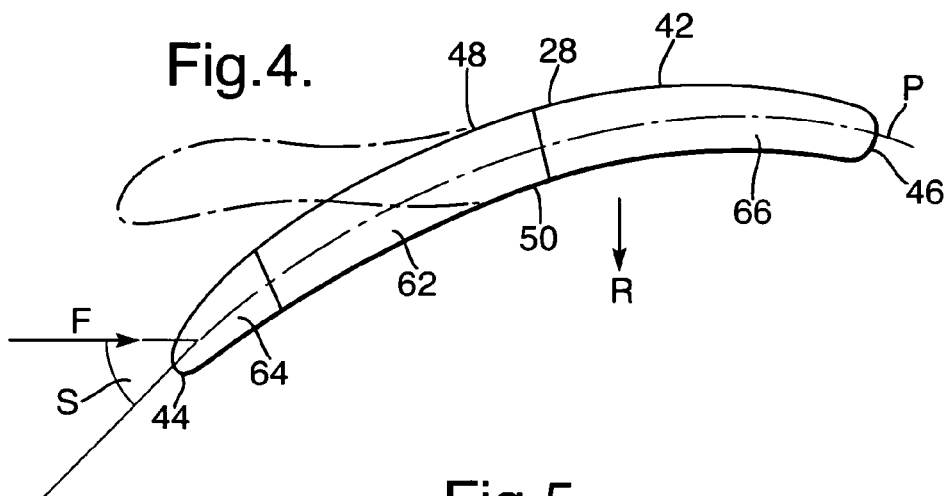
FIG. 4 is an enlarged cross-sectional view along line B-B through the composite blade shown in FIG. 2.
Figure 5:
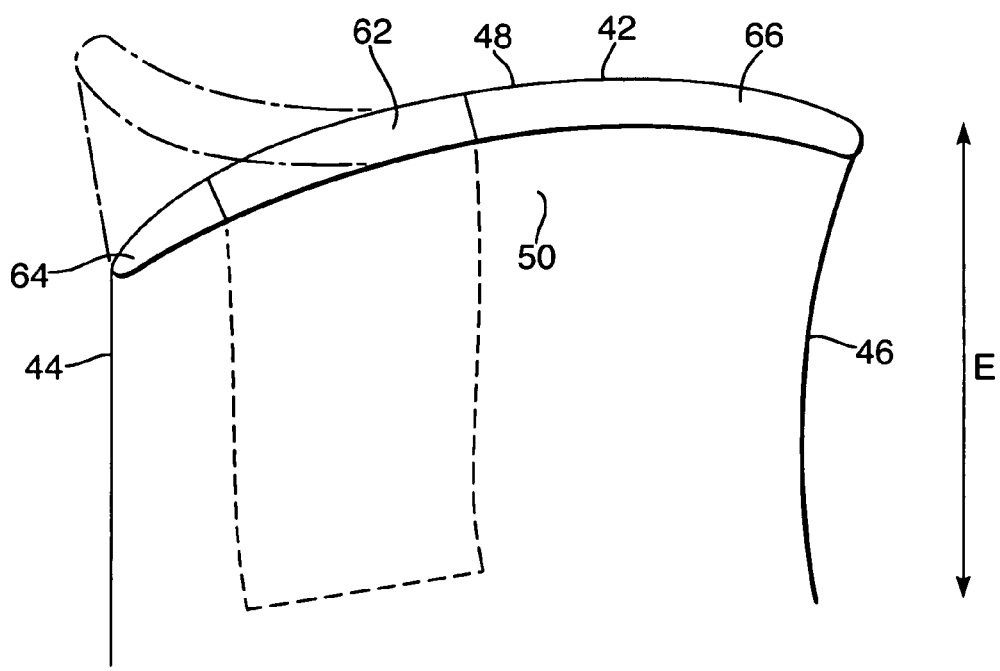
FIG. 5 is a perspective view of the tip of the composite blade.

In FIG. 3 the dashed lines indicate the shape of the aerofoil portion 38 of the fan blade 26 adjacent the root portion 36 at part speed, e.g. cruise, conditions and the full lines indicate the position of the aerofoil portion 38 of the fan blade 26 adjacent the root portion 36 at high-speed conditions and in FIG. 4 the full lines indicate the shape of the tip 42 of the fan blade 26 at part speed, e.g. cruise, conditions and the dashed lines indicate the shape of the tip 42 of the fan blade 26 at high-speed conditions. FIGS. 3 and 4 also show the direction of flow F of the airflow onto the fan blades 26 and the direction of rotation of the fan blades 26 and the stagger angle S. Stagger angle is well known to those skilled in the art. Thus, it is seen in FIG. 3 that the stagger angle S, or twist, has been reduced in the high speed, e.g. take off, condition compared to the part speed, e.g. cruise, condition.

Figure 6:
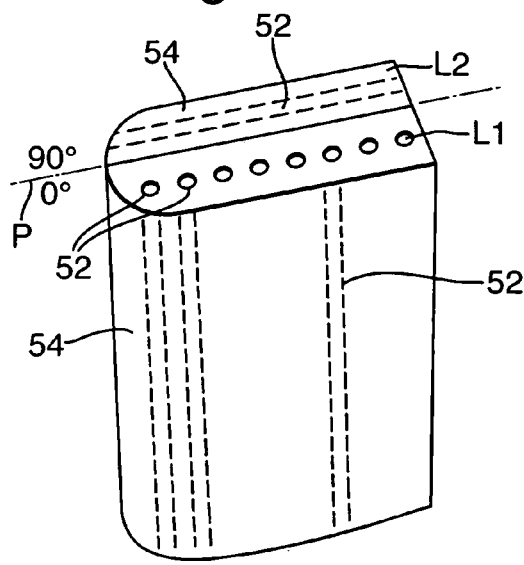
FIG. 6 is an asymmetric arrangement of the reinforcing fibres for use in the composite blade according to the present invention.
Figure 7:
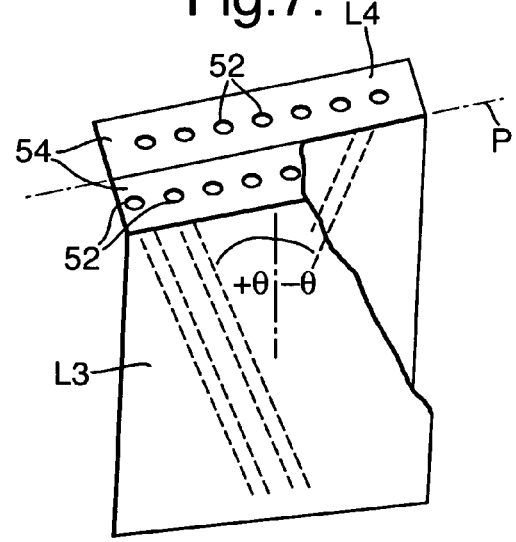
FIG. 7 is another asymmetric arrangement of the reinforcing fibres for use in the composite blade according to the present invention.
Figure 8:
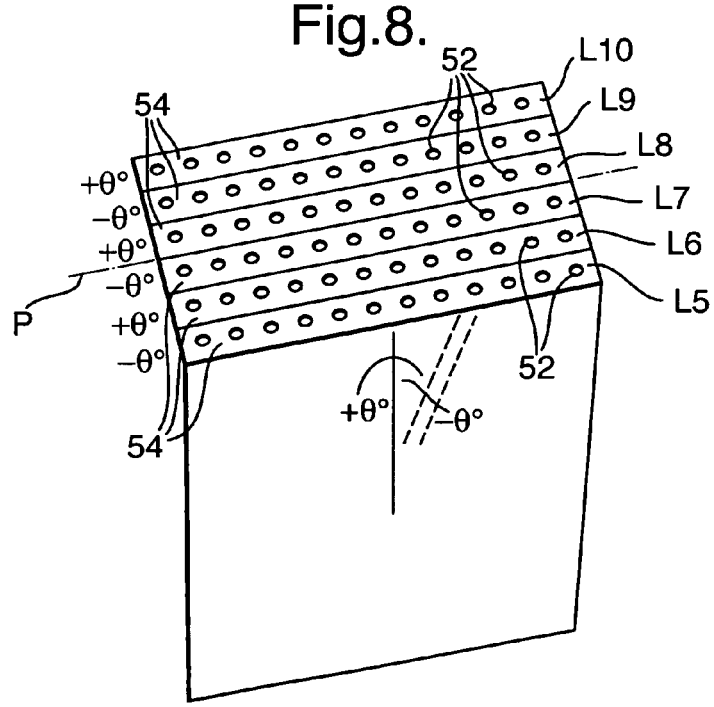
FIG. 8 is a further arrangement of the reinforcing fibres for use in the composite blade according to the present invention.
Figure 9:
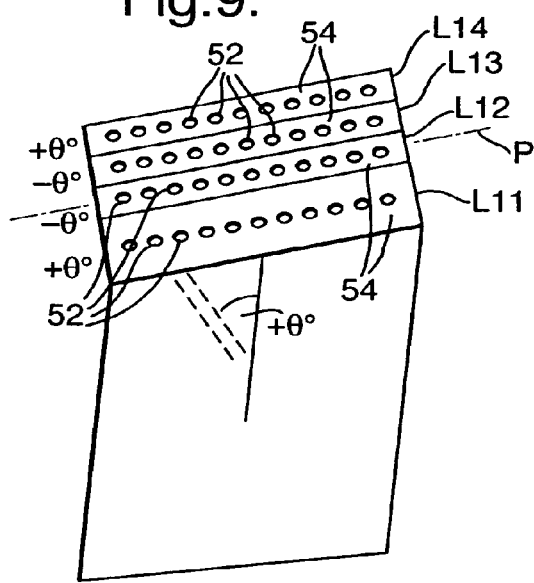
FIG. 9 is an alternative asymmetric arrangement of the reinforcing fibres for use in the composite blade according to the present invention.
Figure 10:
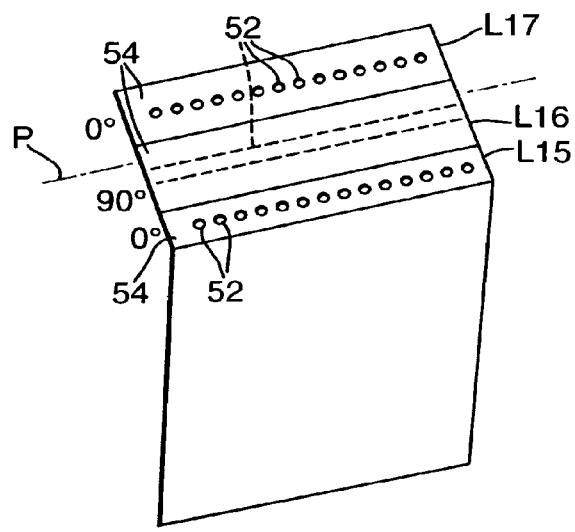
FIG. 10 is a further alternative arrangement of the reinforcing fibres for use in the composite blade according to the present invention.
Figure 11:
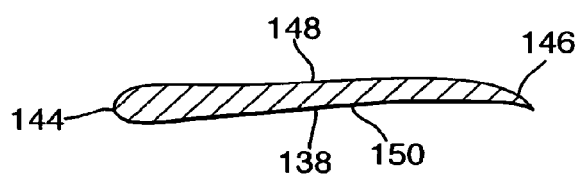
FIGS. 11, 12 and 13 show enlarged cross-sectional views of alternative tip arrangements of the aerofoil portions of fan blades.
Figure 12:
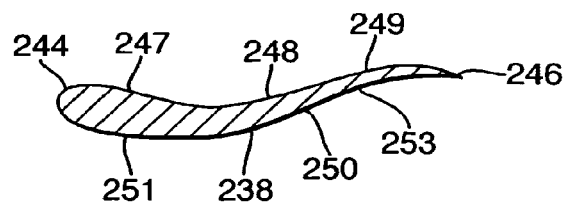
Figure 13:
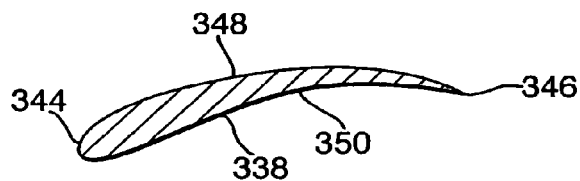

For example the asymmetric lay up of reinforcing fibres 52 comprises two bonded layers L1 and L2 with the reinforcing fibres 52 in one layer L1 arranged perpendicularly to the reinforcing fibres 52 in the other layer L2, the reinforcing fibres 52 in one layer L1 are arranged in the radial direction and the layers L1 and L2 are the same thickness, as shown in FIG. 6. In another example the asymmetric lay up of reinforcing fibres 52 comprises two bonded layers L3 and L4 with the reinforcing fibres 52 in one layer L3 arranged at angles of +θ to the radial direction and the reinforcing fibres 52 in the other layer L4 arranged at an angle of −θ to the radial direction and the layers L3 and L4 have the same thickness, as shown in FIG. 7. A further example of an asymmetric lay up of reinforcing fibres 52 includes an even number, for example six, of bonded layers L5 to L10 with the reinforcing fibres 52 in the layers L5 to L10 arranged alternately at angles of +θ and −θ to the radial direction and the layers L5 to L10 are of equal thickness, as shown in FIG. 8. Another example of an asymmetric lay up of reinforcing fibres 52 includes an even number of, for example four, bonded layers L11 to L14 with the reinforcing fibres 52 in the first and last layers L11 and L14 arranged at an angle of +θ radial direction and the reinforcing fibres 52 in the second and third layers L12 and L13 arranged at an angle of −θ to the radial direction and three of the layers L12, L13 and L14 are of equal thickness, as shown in FIG. 9. Another example of an asymmetric lay up of reinforcing fibres 52 comprises three bonded layers L15 to L17 with the reinforcing fibres 52 in adjacent layers L15 to L17 arranged perpendicularly and the reinforcing fibres 52 in two layers L15 and L17 arranged in the radial direction and the reinforcing fibres 52 in two adjacent layers L16 and L17 have the same thickness, but L15 has a different thickness as shown in FIG. 10. Other suitable arrangements well know to those skilled in the art may be used, for example the angles of the fibres in the layers may be different and not just +θ and −θ. An asymmetric lay up of reinforcing fibres is a lay up where the layers are not symmetric about the centre plane P. The planes of these layers of reinforcing fibres 52 are generally arranged to extend in the direction from leading edge 44 to trailing edge 46 of the fan blade 26 and from root portion 36 to tip 42.

These asymmetric lay ups of reinforcing fibres 52 are subjected to in plane loads during operation of the fan blade 26 in the turbofan gas turbine engine 10. These in plane loads cause bending of the aerofoil portion 38 at the regions 56, 58 and 62 having the asymmetric lay ups of reinforcing fibres 52. The bending of the aerofoil portion 38 at the regions 56 and 58 at the leading and trailing edges 44 and 46 adjacent the root portion 36 causes the whole of the aerofoil portion 38 to untwist, to reduces its stagger angle, with increasing rotational speed of the fan rotor 24. The bending of the aerofoil portion 38 at the region 62 at the mid-chord at the tip 42 of the aerofoil portion 38 causes the tip of the aerofoil portion 38 to bend from a C-shaped cross-section in which the suction surface 48 is convex and the pressure surface 50 is concave to an S-shaped cross-section in which the suction surface 48 has a concave portion 70 and a convex portion 72 and the pressure surface 50 has a convex portion 74 and a concave portion 76 with increasing rotational speed of the fan rotor 24. The concave portion 70 on the suction surface 48 gives rise to an effect called precompression, which is a supersonic effect. There is a point at each radial position, in the direction from the root portion 36 to the tip 42, along the aerofoil portion 38 of the fan blade 26 in the region E at which the bending, inflexion, of the tip 42 of the aerofoil portion 38 commences, as indicated by dashed line L.

The untwisting effect and the inflexion effect, the changing from C-shape cross-section to S-shape cross-section, work together, but it may be possible to use the untwisting effect without the inflexion effect and visa-versa.

The advantage of the present invention is that the fan blades are more aerodynamically efficient at both take off conditions and at cruise conditions and results in a reduction in the specific fuel consumption (SFC) of the turbofan gas turbine engine. It is estimated that the fan blades may reduce the specific fuel consumption (SFC) during take off by up to 3%, where gas turbine engines continue to operate at conventional cruise speeds.

In addition, the present invention has additional benefits such as a reduction in engine heating during high speed, e.g. take off, conditions and this may enable the use of materials with lower temperature capability and hence cheaper materials.

In addition, in order to further reduce the specific fuel consumption (SFC) it is desirable to operate with lower cruise speeds and lower altitudes. The present invention may enable the optimisation of the fan blade aerodynamics over a wider difference in rotational speed from take off to cruise than has hitherto been possible.

In the case of start up and windmill home, where the rotational speed of the fan rotor and fan blades is usually very low, the centripetal force is minimal and the fan blade is very closed, twisted. It may be necessary to provide additional asymmetric lay ups of reinforcing fibres so as to counteract the untwist effect. Ideally the fan blades are oriented such that the windmill effect does not take place, i.e. such that the effect of the gas stream on the aerofoil portions of the fan blades does not supply sufficient torque to overcome the friction of the damaged rotor assembly, so that the fan rotor cannot rotate. The advantage of this is that damaging vibration levels normally associated with windmill home would not take place.

Although the present invention has been described with reference to asymmetric lay ups of layers of reinforcing fibres it is equally possible to provide asymmetric arrangements of three dimensionally woven reinforcing fibres to achieve the same effects.

Although the present invention has been described with reference to organic matrix composites with carbon fibres or glass fibres, it is equally applicable to metal matrix composites or ceramic matrix composites with ceramic fibres, for example silicon nitride or silicon carbide.

Although the present invention has been described with reference to fan blades it may equally well apply to compressor blades, propeller blades or turbine blades. It may be used for different types of fluids e.g. gas, air, liquid, water.

Figure 14A:
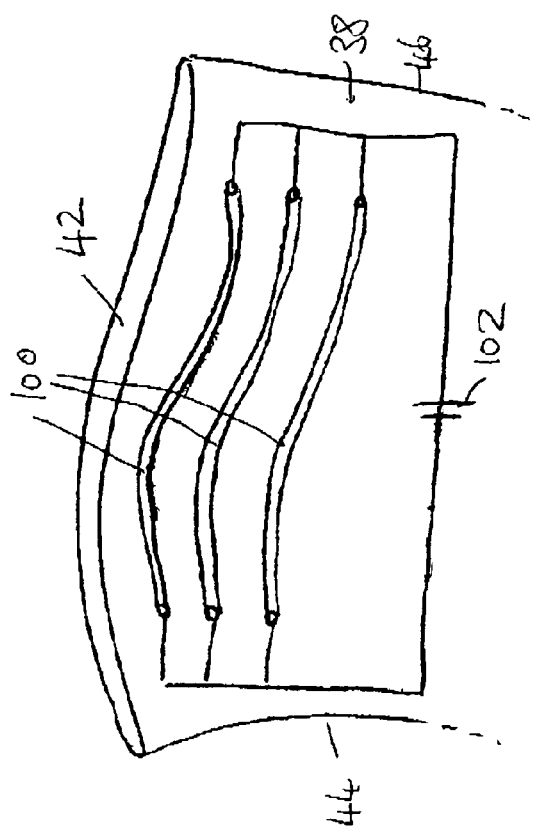
FIGS. 14A and 14B show a sectional view of an aerofoil incorporating shape memory members in accordance with the present invention.
Figure 14B:
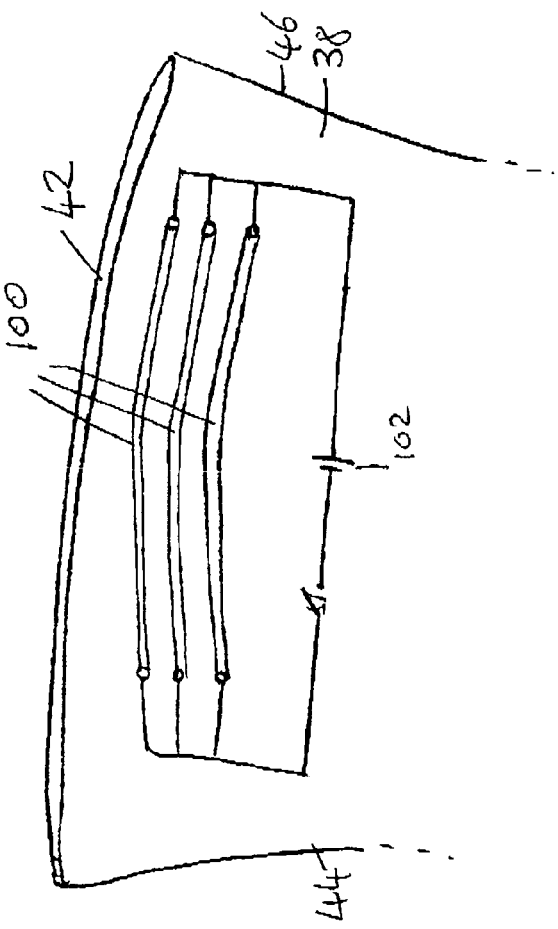
Figure 15B:
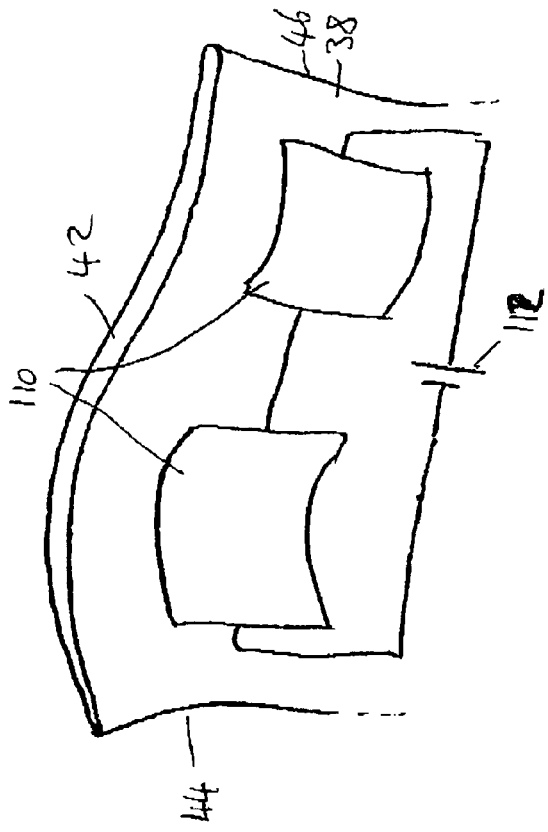
FIGS. 15A and 15B show a sectional view of an aerofoil incorporating piezoelectric members in accordance with the present invention.
Figure 15A:
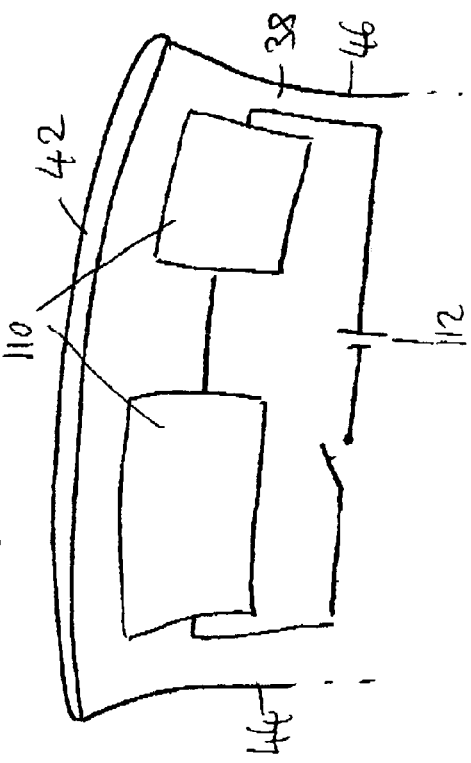

It may be possible to provide active control mechanisms to actuate the untwist mechanism and the inflexion mechanism. The active control mechanism 300 may comprise piezoelectric members 110 (See FIGS. 15A and 15B) or shape memory material members 100 (See FIGS. 14A and 14B) provided within the fan blade at the appropriate positions e.g. at the mid chord region at the tip and/or the leading edge and trailing edge regions adjacent the root portion of the aerofoil portion to actively move the fan blade at those positions. The piezoelectric member 110 would be supplied with electricity from an electrical power supply 112 to accentuate the effect of the asymmetric lay up of reinforcing fibres in the composite material to change the shape of the fan blade. The electricity may be supplied directly through a slip ring or indirectly through magnetic induction. The magnetic field would be generated in the fan casing, radially outward of the fan blades in order to produce changes near the tips of the aerofoil portions of the fan blades and also in the bearing housing directly radially inward the fan blades in order to produce changes in the aerofoil portions of the fan blades near the root portion. The bearing housing is normally offset axially from the fan rotor, and the magnetic forces would have a greater effect on the region at the trailing edge than on the region at the leading edge, but nevertheless an untwist effect is possible. The shape memory alloy 100 would be heated for example by an electrical power supply 102 to accentuate the effect of the asymmetric lay up of reinforcing fibres in the composite material to change the shape of the fan blade. The use of shape memory material 100 and asymmetric lay up of reinforcing fibres effects together enable the optimisation of aerodynamic configurations of the aerofoil portions of the fan blades for windmill home or to further optimise the flight cycle for a range of different mission types.

The present invention is also applicable to other types of composite blades e.g. bimetallic blades, in which the aerofoil portion adjacent the root portion having regions at least at the leading edge and trailing edge comprising an asymmetric arrangement of layers of two different metals/alloys. The present invention is also applicable to bimetallic blades in which the aerofoil portion adjacent the tip having at least a region at the mid chord comprising an asymmetric arrangement of layers of two different metals/alloys. An asymmetric arrangement of metals/alloys is an arrangement where the layers of metals/alloys are not symmetric about a centre plane. The plane of the layers of the metal/alloys are arranged to extend in the direction from leading edge to trailing edge of the fan blade and from root portion to tip. Thus layers of different metals are bonded to each other.

These asymmetric arrangements of layers of different metals/alloys are subjected to in plane loads during operation of the fan blade in the turbofan gas turbine engine. These in plane loads cause bending of the aerofoil portion at the regions having the asymmetric arrangement of different metals/alloys.

The composite blades may comprise other asymmetric sandwich, layered, structures.

The present invention may also be applicable to integrally bladed rotors, wherein the blades are formed integrally with the rotor and thus the blades are not provided with a root which locates in a slot in a rotor disc. Rather the root portion is formed integrally with a rotor disc.

The invention is claimed is:

1. A composite blade comprising a root portion and an aerofoil portion, the aerofoil portion having a tip, a chord, a leading edge, a trailing edge, a suction surface extending from the leading edge to the trailing edge and a pressure surface extending from the leading edge to the trailing edge, the composite blade comprising reinforcing fibres in a matrix material, the aerofoil portion adjacent the tip having at least a region at the mid chord comprising an asymmetric arrangement of reinforcing fibres, said asymmetric arrangement of reinforcing fibers subjected to in plane loads during operation, said in plane loads causing said aerofoil to bend at said mid chord region adjacent said tip of said blade which in turn causes said tip of said blade to bend between a C-shaped formed cross-section and an S-shaped formed cross-section.

2. A composite blade as claimed in claim 1 wherein the aerofoil portion adjacent the root portion having regions at least at the leading edge and trailing edge comprising an asymmetric arrangement of reinforcing fibres, said composite blade being movable between a first position having a first twist angle and a second position having a second twist angle.

3. A composite blade as claimed in claim 1 wherein the composite blade is any one of a compressor blade, a fan blade, a propeller blade or a turbine blade.

4. A composite blade as claimed in claim 3 wherein the composite blade comprises a metal matrix material.

5. A composite blade as claimed in claim 4 wherein the composite blade comprises ceramic fibres.

6. A composite blade as claimed in claim 5 wherein the ceramic fibres comprise silicon carbide fibres or silicon nitride fibres.

7. A composite blade as claimed in claim 3 wherein the composite blade comprises a ceramic matrix material.

8. A composite blade as claimed in claim 1 wherein the composite blade comprises an organic matrix material.

9. A composite blade as claimed in claim 8 wherein the organic matrix material comprises an epoxy resin.

10. A composite blade as claimed in claim 8 wherein the reinforcing fibres comprise carbon fibres or glass fibres.

11. A composite blade as claimed in claim 1 wherein the asymmetric arrangement of reinforcing fibres comprising an asymmetric lay up of layers of reinforcing fibres.

12. A composite blade as claimed in claim 1 wherein the asymmetric arrangement of reinforcing fibres comprising an asymmetric arrangement of three dimensionally woven reinforcing fibres.

13. A composite blade comprising a root portion and an aerofoil portion, the aerofoil portion having a tip, a chord, a leading edge, a trailing edge, a suction surface extending from the leading edge to the trailing edge and a pressure surface extending from the leading edge to the trailing edge, the composite blade comprising reinforcing fibres in a matrix material, the aerofoil portion adjacent the tip having at least a region at the mid chord comprising an asymmetric arrangement of reinforcing fibres wherein an active control mechanism is provided in the aerofoil portion.

14. A composite blade as claimed in claim 13 wherein the active control mechanism comprising a shape memory material member.

15. A composite blade as claimed in claim 13 wherein the active control mechanism comprising a piezoelectric member.

16. A rotor assembly comprising a rotor carrying a plurality of circumferentially arranged radially outwardly extending composite blades, each composite blade comprising a root portion and an aerofoil portion, the aerofoil portion having a tip, a chord, a leading edge, a trailing edge, a suction surface extending from the leading edge to the trailing edge and a pressure surface extending from the leading edge to the trailing edge, each composite blade comprising reinforcing fibres in a matrix material, the aerofoil portion adjacent the tip having at least a region at the mid chord comprising an asymmetric arrangement of reinforcing fibres such that in operation the tip of the composite blade is movable between a first position having a C-shaped cross-section at a first rotational speed and a second position having an S-shaped cross-section at a second, higher, rotational speed.

17. A rotor assembly as claimed in claim 16 wherein the aerofoil portion adjacent the root portion having regions at least at the leading edge and trailing edge comprising an asymmetric arrangement of reinforcing fibres such that in operation the composite blade is movable between a first position having a first twist angle at the first rotational speed and a second position having a second, smaller, twist angle at the second, higher, rotational speed.

18. A rotor assembly as claimed in claim 17 wherein each composite blade having an active control mechanism to move the composite blade between the first twist angle and the second twist angle.

19. A rotor assembly as claimed in claim 16 wherein the composite blades are compressor blades, fan blades, propeller blades or turbine blades.

20. A rotor assembly as claimed in claim 16 wherein the composite blades comprise an organic matrix material.

21. A rotor assembly as claimed in claim 20 wherein the organic matrix material comprises an epoxy resin.

22. A rotor assembly as claimed in claim 20 wherein the reinforcing fibres comprise carbon fibres or glass fibres.

23. A rotor assembly as claimed in claim 16, wherein the composite blades comprise a metal matrix material.

24. A rotor assembly as claimed in claim 23 wherein the composite blade comprises ceramic fibres.

25. A rotor assembly as claimed in claim 24 wherein the ceramic fibres comprise silicon carbide fibres or silicon nitride fibres.

26. A rotor assembly as claimed in claim 16, wherein the composite blades comprise a ceramic matrix material.

27. A rotor assembly as claimed in claim 16 wherein the asymmetric arrangement of reinforcing fibres comprises an asymmetric lay up of layers of reinforcing fibres.

28. A rotor assembly as claimed in claim 16 wherein the asymmetric arrangement of reinforcing fibres comprises an asymmetric arrangement of three dimensionally woven reinforcing fibres.

29. A rotor assembly as claimed in claim 16 wherein each composite blade having an active control mechanism to move the tip of the aerofoil position between the first position having a C-shaped cross-section and the second position having an S-shaped cross-section.

* * * * *